United States Patent
Koch et al.

(10) Patent No.: US 6,581,510 B2
(45) Date of Patent: Jun. 24, 2003

(54) COOKING APPARATUS

(75) Inventors: Bernhard Koch, Hannover (DE); Markus Dittrich, Neustadt am Rübenberge (DE); Rainer Jahnel, Wunstorf (DE)

(73) Assignee: Klockner Hansel Processing GmbH (DE)

( * ) Notice: Subject to any disclaimer, the term of this patent is extended or adjusted under 35 U.S.C. 154(b) by 0 days.

(21) Appl. No.: 10/170,556

(22) Filed: Jun. 12, 2002

(65) Prior Publication Data
US 2002/0185011 A1 Dec. 12, 2002

(30) Foreign Application Priority Data
Jun. 12, 2001 (DE) .......................................... 101 28 287

(51) Int. Cl.[7] .................................................. A47J 27/00
(52) U.S. Cl. ........................... 99/348; 99/483; 165/145; 366/144; 366/149; 366/337
(58) Field of Search ..................... 99/348, 483; 366/144, 366/147–149, 337; 165/159, 165, 145

(56) References Cited

U.S. PATENT DOCUMENTS 4,724,754 A * 2/1988 Corzat et al. ................. 99/348
4,892,033 A * 1/1990 Sollich ......................... 99/455
5,957,037 A * 9/1999 Paget ........................... 99/326

* cited by examiner

Primary Examiner—Timothy F. Simone
(74) Attorney, Agent, or Firm—Pendorf & Cutliff

(57) ABSTRACT

A cooker designed for sugar products in the form of a tube heat exchanger, in which within a jacket housing a bundle of narrowly spaced pipes flow through by a heat medium extend, which pipes are flowed over by material which are supplied and withdrawn by pipe fittings along the side, wherein deflection plates are provided within the jacket housing which define flow chambers and openings for the transition of the materials to be treated from one flow chamber to the next, thereby characterized, that the deflection plates (5) along a narrow edge area are provided with segment like openings (6) and these openings are situated on diametrically opposing sides of the inner wall of the jacket housing (1), wherein the opening in the first deflection plate in the flow direction lies opposite the introduction pipe fitting (11) for the material and the opening of the last deflection plate lies opposite the withdrawal pipe fitting (12).

11 Claims, 3 Drawing Sheets

COOKING APPARATUS

BACKGROUND OF THE INVENTION

1. Field of the Invention

The invention concerns a device conventionally referred to a "cooker" for the thermal processing of materials for the production of sugar-containing or confectionary products.

The essential components of such materials include sugar or sugar substitutes of various types in mixture with other nutrients and culinary additives such as starches, lactose products, gelatinizers and the like. Depending upon the type of material, the thermal treatment may be any of heating, solublizing and/or cooking, and the requirements for the thermal treatment can vary greatly depending on the type of the material to be treated. Many materials contain components which are liable to burn during heating, or which must be handled with thermal sensitivity. This applies, for example, to milk or milk components, fruit components or gelatinizing agents such as gelatin, starches, pectin, and gum arabicum.

2. Description of the Related Art

There are many types of cookers, which are, however, as a whole, not satisfactory in all respects. The oldest type are the so-called salt cookers (a type of heated kettle), which often were equipped with stirrers and were satisfactory for the batch-wise treatment of simple, less sensitive materials. However, as soon as the materials were used which were liable to burn, there were problems. It helped in part to provide the stirrers with scrapers ("scraped heating surfaces"). Besides this, continuous processes were not possible with these cookers.

For a continuous processing, the so-called coiled pipe cookers have been in use even until today. In the coiled pipe cooker, the material to be treated flows through a coiled pipe, which is heated from outside by a heating medium. Various attempts have been made to overcome this problem, including, for example, a flattening of the cross-section of the coiled pipes for increasing the velocity of the material flowing through the coil pipe in the wall area, so it is by these measures that the contact time between the material and the heating surface is kept as small as possible.

The success of this type of measure is, however, limited, and the cooker must frequently be turned off for cleaning. Many substances, in particular those based on starch, could not be satisfactorily processed at all. For these substances, until now the so-called jet-cookers have been preffered, in which super heated steam is injected directly into the substances. The advantage of this process is the relatively simple technical application, and the fact that no heating surface is present onto which the substance can burn. The disadvantages include the direct contact between the heating medium and the substance.

In recent times, a cooker type has become known, which operates on the principle of a tubular heat exchanger and is described, for example, in DE-C 35 28 426. In this cooker, a tube bundle of a longitudinally extending tubular heat exchangers is flowed through by a heating medium, while the substance to be treated flows around the outside of the tubes within the jacket of the heat exchanger. It is forced in a flow path running essentially perpendicular to the pipes of the pipe bundle via baffles or deflection plates, which extend in the inner space of the thermal exchanger and are passed through by the tubes of the tube bundle, and, thereby, experience a supplemental agitation or mixing. This results in a good energy transference, which is possible due to the application of a low temperature difference between the substance and the heating medium, with the consequence, that a tendency towards burning is minimized, and the product quality is improved.

During the heating or, as the case may be, cooking of a product which has a tendency to burn, there forms with all conventional continuous cookers, without scraped heating surfaces, a depositing of product upon the heating surfaces. The layer thickness of this deposited product increases with the passage of time, whereby the thermal transference from heating medium to product is reduced. In order to maintain the desired product temperature, as constant as possible, the temperature of the heating medium must be increased, whereby the burning effect is further accelerated. Further, these burned deposits lead to the risk of a release of burned particles, which become distributed throughout the product. During the use of thermally liable products, at least partial thermal decomposition of these products occurs, which can become apparent as discoloration, and which is partially compensated with overdosing. All of these are better avoided using the cooker described in DE-C 35 28 426 than with the conventional types of cookers.

This known cooker exhibits problems, which can be traced back in particular to the baffles or deflection plates. These deflection plates mainly define flow chambers running between them perpendicular to the tubes in such an arrangement, that the material sequentially flows through a ring shaped gap between the one deflection plate and the inner wall of the cooker, and then through a central opening in the next deflection plate, that is, practically from the edge zone of the cooker to the center, and then again to the edge zone, etc. Further, there exists in the introduction and withdrawal areas of the substance, zones without forced flow-through, that is, in these areas material can reside for indeterminate lengths, so the occurrence of burning is possible. Further, the steam conducting pipes in the area of the central opening of the deflection plates are in part not flowed-by perpendicularly, but rather in the direction longitudinal to these pipes, whereby in these areas the material is not subject to turbulence and mixing. As a practical matter, as a result of design, there are exit zones at the deflection plates with edge recesses or perforations in the area of the central axis between the steam conducting pipes which are not flowed through.

SUMMARY OF THE INVENTION

With the present invention, these problems are to be avoided and the technology is to be provided with a cooker which is optimally suited for all possible types of materials to be treated.

Beginning with a cooker in the form of a tubular heat exchanger, in which tubes in a bundle extend longitudinally within a jacket housing, and are individually flown through by a heating material, and in which the material to be treated is introduced and withdrawn via pipe fittings along the jacket sides, which material to be treated flows over the outside of these tubes, wherein deflection plates are provided within the jacket, which plates define flow chambers and which include openings for the transition of the material to be treated from one flow chamber to the next, it is inventively provided that the baffle plates are provided along one narrow edge area with segment-like openings and that these openings are located alternating on diametrically opposite sides of the inner walls of the jacket housing, wherein in the flow direction, the opening of the first deflection plate lies opposite to the introduction fitting for the material, and the opening of the last deflection plate lies opposite the withdrawal fitting.

In accordance with the invention, it is achieved in constructively simple, however, extraordinarily effective manner, that the material to be treated is directed along a zigzag flow path perpendicular to the heating pipes, and that there are no areas in which partial flows or side currents can break out and be delayed somewhere with undetermined dwell time. Therewith, the material can flow within the chambers only perpendicularly to the heating pipes, never in parallel to the pipes. In combination with the conventional inherent advantages of a cooker operating on the principle of a tubular heat exchanger, an optimal result can now be guaranteed for practically any material to be treated, regardless of its composition. It is of course understood that the operating parameters of the cooker, such as temperature, pressure and flow-through speed, are to be adjusted in known manner for the material to be treated.

BRIEF DESCRIPTION OF THE DRAWINGS

Further details and characteristics of the invention are defined in the dependent claims and explained in the illustrative embodiment on the basis of the figures. Therein there is shown:

DETAILED DESCRIPTION OF THE INVENTION

Figure 1:
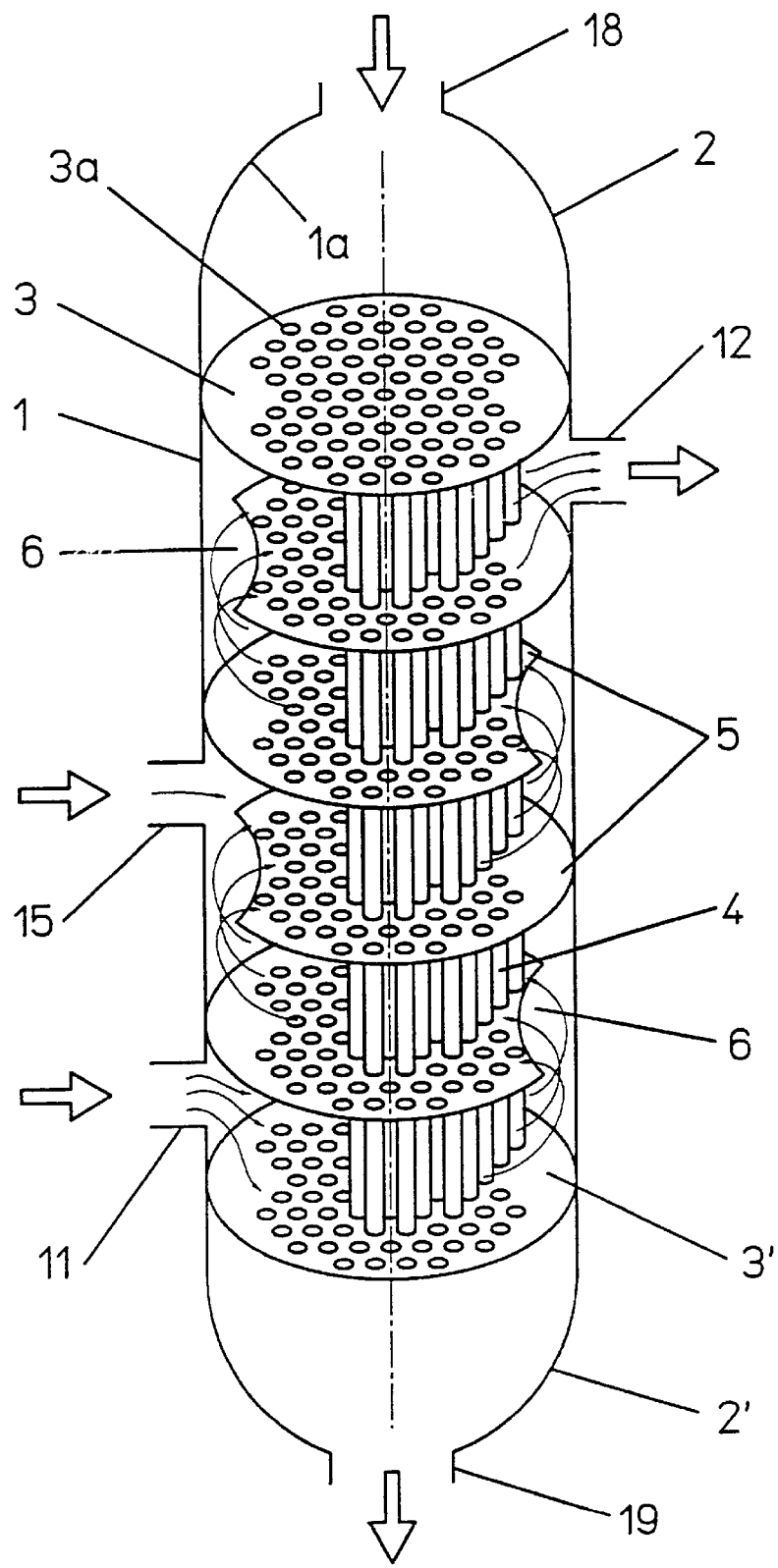
FIG. 1 the basic design of an inventive cooker in perspective-schematic view.

In the basic design shown schematically in FIG. 1 of a cooker, one can see that this is based upon the principle of a tubular bundle heat exchanger. This is provided within a pipe-shaped jacket or casing 1, which transitions on its two ends into a connection hub 2, 2'. In the area of the transition from jacket housing 1 into the connection hubs 2, 2', there are two pipe plates 3, 3', which exhibit a large number of closely bunched boreholes 3a, through which a correspondingly narrow bunched preferably straight tubes 4 extend.

The device described until now exhibits a very slim shape (the relationship of length to diameter is greater than 3:1) and is oriented erect. It is provided with a number of connections, namely, a pipe fitting 11 close above the lower pipe plate 3' for the introduction of the material to be treated; a pipe fitting 12 close below the upper pipe plate 3 for the withdrawal of the treated material, as well as with two pipe fittings 18 and 19 in the vicinity of the two connection hubs 2, 2' for the introduction or, as the case may be, removal of the heating medium. Further, connection pipe fittings can be provided for the supplemental introduction or also withdrawal of the materials. This is shown in FIG. 1 by way of example as a supplemental connection 15.

In operation the material to be treated flows from the lower introduction pipe fitting 11 into the jacket housing and exits through the upper end withdrawal pipe fitting 12. The heating medium flows in, counter-current, from upwards downwardly; it enters in the upper introduction pipe fitting 18, flows through the bundle of tubes 4 and leaves the device through the lower withdrawal pipe fitting 19. It is also possible for the pipe fitting 12 to be the introduction fitting, and the pipe fitting 11 to be the withdrawal fitting, so that material being treated flows through the cooker from above downwardly. For the heating medium, there applies then likewise the reverse flow direction. What is important is that within the jacket, housing baffles or deflection plates 5 are provided, which, respectively with the exception of the openings 6, are connected flow-tight with the inner wall 1a of the jacket housing 1 and are also flow tight passed through by tubes 4. The openings 6 of the deflection plates 5 are thereby in rising sequence diametrically offset with respect to each other, and namely in such a manner, that the opening 6 of the first, lower deflection plate is located precisely along the oppositely lying side of the introduction pipe fitting 11, the opening of the next higher deflection plate 5 on the opposite lying side to the first opening, etc., up to the upper opening, which again is situated on the opposite side of the withdrawal pipe fitting 12.

The internal space of the cooker is divided into individual flow chambers by the deflection plates, and it is achieved by the diametrically opposite lying arrangement of the openings 6, that the material flowing into the jacket housing flows through the individual chambers respectively zigzag pattern from below towards upwards, until the mass finally again leaves through the withdrawal pipe fitting 12. The material can pass from one chamber into the next sequential chamber only by passing through the area of the openings 6, and this with a respective direction change of 180°. Therewith, the material can only flow perpendicular to the tubes 4 within the chambers, never in the same direction as the tubes. Thereby, only very short contact times result at the individual tubes, which along all points within the cooker are practically of identical lengths. There are no points of the heating tubes 4 which experience a substantially longer contact time for the material, with which the dwell time of partial streams deviate substantially from the main stream of flow. The mass is thus evenly and carefully heated.

Figure 2:
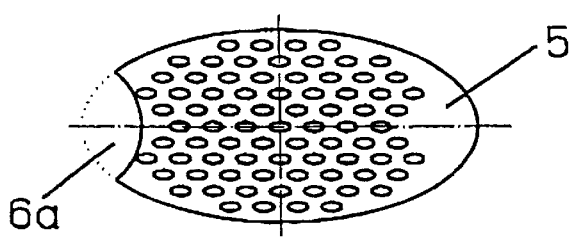
FIG. 2 in the same view, examples for the design of the side through-holes in the baffle plates, FIG. 3 an example showing changing of the cross-section of the flow through openings, and FIG. 4 another example thereof.
Figure 2:
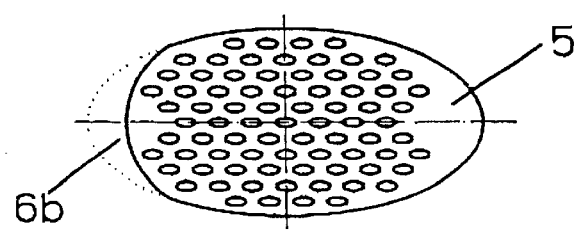
Figure 2:
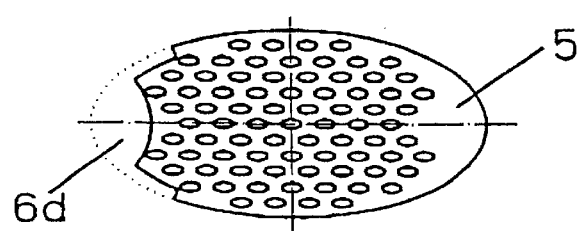
Figure 2:
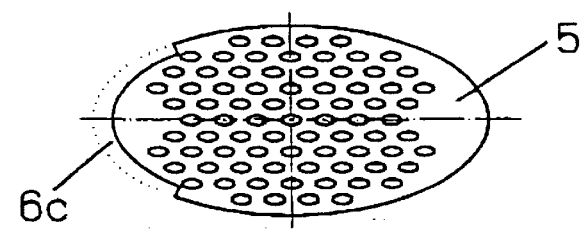
Figure 2:
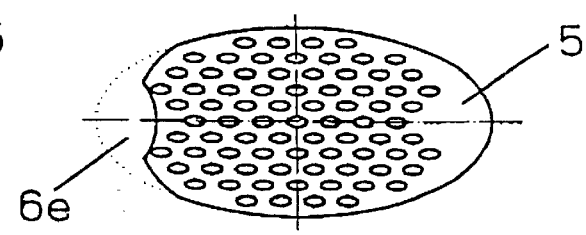

Overall, the flow-directing components within the jacket housing, that is, the deflection plates 5 with the openings 6, are so designed, that the viscosity change of the material to be treated is precalculated in such a manner, that the flow speed perpendicular to the tube bundle between the deflection plates is kept as constant as possible. This can be achieved thereby, that the separation between two deflection plates, that is, the volume of the chambers defined between two deflection plates, is varied, for example—increases from below going upwards in a predefined manner. Also, the size and shape of the openings 6 can be appropriately varied for keeping the flow as even as possible along the flow path of the material, whereby the details of the size and shape of the openings 6 are naturally also influenced by the type of the material to be treated. FIG. 2 shows five examples of different shaped openings 6a–6e.

Figure 3:
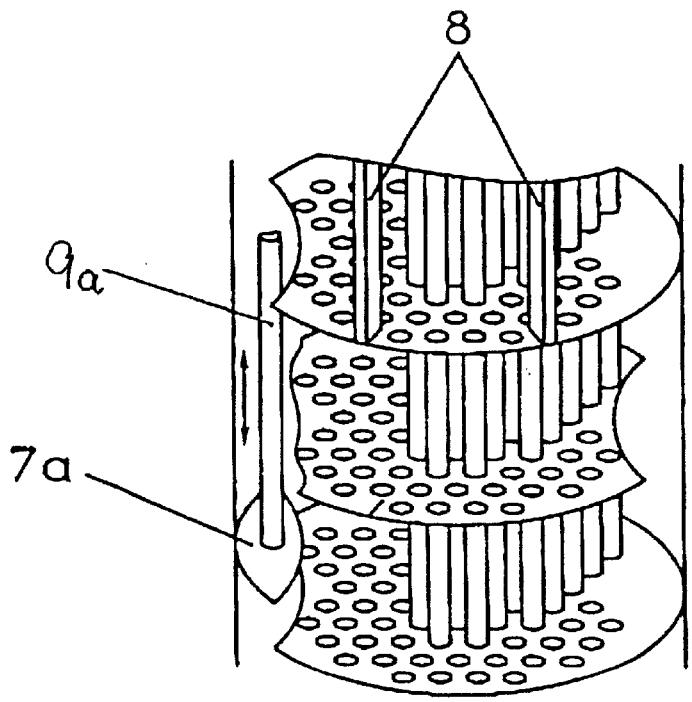
Figure 4:
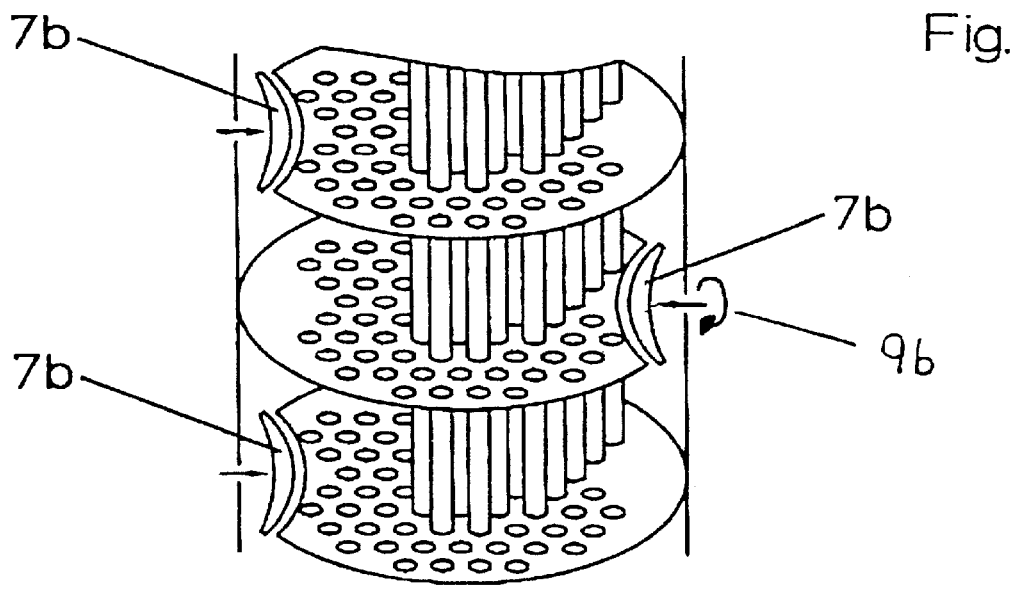

In the description of the inventive cooker it has until now been presumed that the flow directing components within the jacket housing 1 are not variable. This need not be the case. By further pursuing the inventive concept it can be seen that the size and shape of the openings 6 can be varied. FIG. 3 shows one possibility of a stepless change of the openings 6 with the aid of an adjustment plate 7a, which is moved upwards or downwards from outside by using a rod 9a which can be acted upon from outside, thereby changing the size and shape of the openings 6. FIG. 4 shows an equivalent solution with the aid of adjustment segments 7b, which can be rotated for example with the aid of a rotation drive 9b from a vertical to a horizontal position, in order to change the area and shape of the openings 6. Both cases, that are shown in FIGS. 3 and 4, make it possible to change the inner structure of the cooker without having to disassemble the cooker. This can be necessary for example when dramatic changes in the consistency of the materials to be treated occur, and this is also advantageous when a cooker is to be switched from treatment of a material A to the treatment of a different material B.

One can also see from FIG. 3 the possibility of using deflection struts 8 for supporting the evenness of the flow through. It is also of course possible, however not possible to illustrate the figure, that these deflection struts can be provided rotatable about their longitudinal axis, so that as required they can be oriented more or less perpendicular to the direction of flow and the flow of the material can therewith be more or less strongly influenced.

Likewise, not further illustrated is the possibility, of providing the deflection plates 5 as such slideable within the jacket housing 1, for example, with an aid of a rod along the rod 9a, in order to vary the size of the chamber between two deflection plates, and this either for the carrying out of the treatment of one particular material A as well as a changing over from material A to a material B.

Finally, it can be mentioned that the circular cross-section of the jacket housing 1 may represent a conventional design of a pipe bundle heat exchanger, but is, however, in no way a limitation for the herein described cooker. Rather, it is also possible, and in many cases more advantageous, when the jacket housing 1 is provided with a different cross-section shape, for example, oval or elliptical, or in certain cases even an extended polygon. Thereby, in individual cases, when the parameters of the material to be treated require it, a better result with respect to the evenness and careful heating of the material can be achieved.

Common to all possible designs of the inventive cooker is that the temperature difference between the heating medium and the end product temperature is very small, so that a very careful and conservative heating occurs. This mitigates against a deposition of the product on the heating surfaces in the case of product which have a tendency to burn. Certainly such adhesion of product is not ruled out in all possible cases; however, it is very minimal in comparison to known cookers not having scraped heat surfaces (inclusive of the cooker known in DE-C 35 28 426), and these can be removed with relatively simple means following relatively long possible production times without intermediate cleaning, that is, as a rule without chemical additives. The possibility of the addition of products which have a relatively strong tendency towards burning to an already heat treated main material mass via one or more supplemental, side pipe fittings, for example, the support or auxiliary pipe fitting 15 between inlet and outlet, further improves this relationship.

An advantageous use of this cooker is that is also recommended for recipes which contain no component which have a tendency towards burning, since the reduced thermal requirement also has a positive effect on the product quality. With additional downstream equipment or components, it is possible to so influence the pressure, in the cooker, so that on the one hand, by heating under pressure higher temperatures are possible without reduction in the water component as would be the case under atmospheric conditions, this being useful for example for acceleration of carmelization (with suppression of boiling), or, as the case may be, to use low pressures at low temperatures to achieve higher dryness in substances with care or preservation of product, for example, for avoidance of carmelization. The compact design and the small outer dimensions, compared to known cookers, make possible with small constructive expenditure a simple incorporation of the cooker in an equipment setup.

What is claimed is:

1. A cooker for the thermal processing of material composition for the production of sugar-containing products, the cooker comprising:

a housing having the form of a tube heat exchanger, the housing having an inner wall and an outer wall;

at least one heat medium introducing pipe fitting;

at least one heat medium removing pipe fitting;

a plurality of deflection plates having perforations, the deflection plates axially disposed in the housing defining flow chambers;

a plurality of narrowly spaced tubes for carrying the heat medium, the tubes passing through the perforations of the deflection plates, wherein the heat medium is introduced into the tubes by the heat medium introducing pipe fittings and removed from the tubes by the heat medium removing pipe fitting;

at least one material introducing pipe fitting;

at least one material removing pipe fitting; and a segment-like opening located at each deflection plate, wherein each opening faces the inner wall of the housing, wherein the openings are arranged diametrically offset with respect to each other, wherein the material flows from one flow chamber to the next one by passing through the segment-like opening of each deflection plate;

wherein the opening of the deflection plate next to the material introducing pipe fitting lies on the opposite side of the pipe fitting;

wherein the opening in the deflection plate next to the material removing pipe fitting lies on the opposite side of the pipe fitting wherein the spacing of the deflection plates can be changed without disassembly of the cooker.

2. Cooker according to claim 1, wherein the distance of separation between the deflection plates (5) is variable.

3. Cooker according to claim 1, wherein the shape and size of the segment-like openings (6) in the deflection plates (5) is variable.

4. Cooker according to claim 1, wherein the jacket housing (1) of the cooker has a longitudinal cross-section, and that the surface area of the deflection plates (6) are appropriately shaped.

5. Cooker according to claim 1, wherein downstream of the cooker additional equipment or components are provided, by which the pressure in the cooker can be adjusted.

6. Cooker according to claim 1, wherein heating tubes (4) are also provided in the area of the segment-like openings (6) of the deflection plates (5), which heating tubes are flowed over by the material, at least in part not primarily transversely.

7. A cooker for the thermal processing of material composition for the production of sugar-containing products, the cooker comprising:

a housing having the form of a tube heat exchanger, the housing having an inner wall and an outer wall;

at least one heat medium introducing pipe fitting;

at least one heat medium removing pipe fitting;

a plurality of deflection plates having perforations, the deflection plates axially disposed in the housing defining flow chambers;

a plurality of narrowly spaced tubes for carrying the heat medium, the tubes passing through the perforations of the deflection plates, wherein the heat medium is introduced into the tubes by the heat medium introducing pipe fittings and removed from the tubes by the heat medium removing pipe fitting;

at least one material introducing pipe fitting;

at least one material removing pipe fitting; and a segment-like opening located at each deflection plate, wherein the each opening faces the inner wall of the housing, wherein the openings are arranged diametrically offset with respect to each other, wherein the material flows from one flow chamber to the next one by passing through the segment-like opening of each deflection plate;

wherein the opening of the deflection plate next to the material introducing pipe fitting lies on the opposite side of the pipe fitting;

wherein the opening in the deflection plate next to the material removing pipe fitting lies on the opposite side of the pipe fitting wherein the spacing of the deflection plates can be changed without disassembly of the cooker;

wherein the shape and size of the segment-like openings (6) in the deflection plates (5) is variable;

wherein the shape and size of the segment-like openings (6) in the deflection plates (5) can be varied without disassembly of the cooker.

8. Cooker according to claim 7, further comprising moveable adjustment elements (7a, 7b) for changing the shape and size of the segment-like openings (6) in the deflection plates (5).

9. A cooker for the thermal processing of material composition for the production of sugar-containing products, the cooker comprising:

a housing having the form of a tube heat exchanger, the housing having an inner wall and an outer wall;

at least one heat medium introducing pipe fitting;

at least one heat medium removing pipe fitting;

a plurality of deflection plates having perforations, the deflection plates axially disposed in the housing defining flow chambers;

a plurality of narrowly spaced tubes for carrying the heat medium, the tubes passing through the perforations of the deflection plates, wherein the heat medium is introduced into the tubes by the heat medium introducing pipe fittings and removed from the tubes by the heat medium removing pipe fitting;

at least one material introducing pipe fitting;

at least one material removing pipe fitting; and a segment-like opening located at each deflection plate, wherein each opening faces the inner wall of the housing, wherein the openings are arranged diametrically offset with respect to each other, wherein the material flows from one flow chamber to the next one by passing through the segment-like opening of each deflection plate;

wherein the opening of the deflection plate next to the material introducing pipe fitting lies on the opposite side of the pipe fitting;

wherein the opening in the deflection plate next to the material removing pipe fitting lies on the opposite side of the pipe fitting;

wherein supplemental deflection slats (8) are provided to extend in the direction of the heating tubes (4) within individual flow chambers.

10. Cooker according to claim 9, wherein the deflection slats (8) are provided rotatable about a longitudinal axis.

11. A cooker for the thermal processing of material composition for the production of sugar-containing products, the cooker comprising:

a housing having the form of a tube heat exchanger, the housing having an inner wall and an outer wall;

at least one heat medium introducing pipe fitting;

at least one heat medium removing pipe fitting;

a plurality of deflection plates having perforations, the deflection plates axially disposed in the housing defining flow chambers;

a plurality of narrowly spaced tubes for carrying the heat medium, the tubes passing through the perforations of the deflection plates, wherein the heat medium is introduced into the tubes by the heat medium introducing pipe fittings and removed from the tubes by the heat medium removing pipe fitting;

at least one material introducing pipe fitting;

at least one material removing pipe fitting; and a segment-like opening located at each deflection plate, wherein each opening faces the inner wall of the housing, wherein the openings are arranged diametrically offset with respect to each other, wherein the material flows from one flow chamber to the next one by passing through the segment-like opening of each deflection plate;

wherein the opening of the deflection plate next to the material introducing pipe fitting lies on the opposite side of the pipe fitting;

wherein the opening in the deflection plate next to the material removing pipe fitting lies on the opposite side of the pipe fitting;

an additional auxiliary pipe fittings (15) located between the at least one material introducing pipe fitting and the at least one material removing pipe fitting for providing supplemental introduction or withdrawal of the material between the material introduction pipe fitting (11) and the material withdrawal pipe fitting (12).

* * * * *